(12) United States Patent
Peng et al.

(10) Patent No.: US 12,368,315 B2
(45) Date of Patent: Jul. 22, 2025

(54) FLUID AND POWER PROVISION APPARATUS

(71) Applicant: Techtronic Cordless GP, Anderson, SC (US)

(72) Inventors: Xiang Peng, Dongguan (CN); Jian Jian Zhong, Dongguan (CN); Zhi Xuan Zheng, Dongguan (CN); Wen Qiang Ye, Dongguan (CN)

(73) Assignee: TECHTRONIC CORDLESS GP, Anderson, SC (US)

(*) Notice: Subject to any disclaimer, the term of this patent is extended or adjusted under 35 U.S.C. 154(b) by 291 days.

(21) Appl. No.: 17/963,307

(22) Filed: Oct. 11, 2022

(65) Prior Publication Data

US 2024/0120766 A1    Apr. 11, 2024

(51) Int. Cl.
*H02J 7/34* (2006.01)
*B60L 53/30* (2019.01)
*F04B 17/03* (2006.01)

(52) U.S. Cl.
CPC .............. *H02J 7/345* (2013.01); *B60L 53/30* (2019.02); *F04B 17/03* (2013.01)

(58) Field of Classification Search
CPC . H02J 7/345; H02J 1/122; H02J 50/05; B60L 53/30; B60L 53/20; F04B 17/03; F04B 39/125; F04B 39/14; F04B 35/06; F04B 35/04; F04B 39/00; F04B 39/0005; F04B 39/0022; F04B 39/121; F04B 39/123; B60C 23/10; H01R 4/48
See application file for complete search history.

(56) References Cited

U.S. PATENT DOCUMENTS

| | | | |
|---|---|---|---|
| 4,902,955 A | 2/1990 | Manis et al. |
| 5,367,243 A | 11/1994 | Wells et al. |
| 5,589,292 A | 12/1996 | Rozon |
| 5,793,185 A | 8/1998 | Prelec et al. |
| 5,931,207 A | 8/1999 | Gianino |

(Continued)

FOREIGN PATENT DOCUMENTS

| CN | 101189434 A | 5/2008 |
|---|---|---|
| CN | 203326656 U | 12/2013 |

(Continued)

OTHER PUBLICATIONS

European Search Report Corresponding to Application No. 23202842 on Jan. 31, 2024.

*Primary Examiner* — Dominick L Plakkoottam
(74) *Attorney, Agent, or Firm* — Dority & Manning, P.A.

(57) ABSTRACT

A fluid and power provision apparatus is provided. The apparatus includes a power provision device and a pump assembly. The pump assembly includes a motor, a transmission system, a piston assembly, and a collar assembly. The piston assembly includes a piston sleeve, a piston, and a piston arm operably coupled to the piston and the transmission system to transmit energy from the motor to articulate the piston within the piston sleeve. The collar assembly forms a collar plenum, a first flowpath, and a second flowpath. The piston sleeve extends at least in part into the collar plenum. The first flowpath extends in fluid communication from the collar plenum to a fluid supply outlet. The second flowpath extends in fluid communication from an interior of the apparatus to the first flowpath.

19 Claims, 14 Drawing Sheets

(56) References Cited

U.S. PATENT DOCUMENTS

| | | | |
|---|---|---|---|
| 5,982,138 A | 11/1999 | Krieger | |
| 6,212,054 B1 | 4/2001 | Chan | |
| 6,262,560 B1 | 7/2001 | Lionberg et al. | |
| 6,636,015 B1* | 10/2003 | Levine | H01M 50/224 320/105 |
| 6,716,003 B2* | 4/2004 | Chen | F04B 35/01 417/415 |
| 6,799,993 B2 | 10/2004 | Krieger et al. | |
| 6,994,599 B2 | 2/2006 | Shurdan | |
| 7,501,795 B2 | 3/2009 | Bertness et al. | |
| 7,692,402 B2 | 4/2010 | Wise | |
| 7,795,838 B2 | 9/2010 | Singarajan et al. | |
| 8,076,900 B1 | 12/2011 | Brown | |
| 8,465,594 B1 | 6/2013 | Harder | |
| 8,641,391 B2 | 2/2014 | Pan | |
| 8,653,415 B2 | 2/2014 | Fosbinder | |
| 9,007,015 B1 | 4/2015 | Nook et al. | |
| 9,506,446 B2 | 11/2016 | Xinfang | |
| 9,548,628 B2 | 1/2017 | Ben Aharon | |
| 9,643,506 B2 | 5/2017 | Lei | |
| 9,653,933 B2 | 5/2017 | Inskeep | |
| 9,797,306 B1 | 10/2017 | Stapleton et al. | |
| 9,871,392 B2 | 1/2018 | Durando et al. | |
| 9,912,183 B2 | 3/2018 | Kokot, Jr. et al. | |
| 9,954,391 B2 | 4/2018 | Lei | |
| 10,093,186 B2 | 10/2018 | Liu et al. | |
| 10,576,573 B2 | 3/2020 | Fosbinder | |
| 10,604,024 B2 | 3/2020 | Nook et al. | |
| 10,731,637 B2* | 8/2020 | Walmsley | F04B 35/06 |
| 10,801,460 B2 | 10/2020 | Butler et al. | |
| 11,165,266 B2 | 11/2021 | Johnson et al. | |
| 11,254,213 B2 | 2/2022 | Nook et al. | |
| 11,277,014 B1 | 3/2022 | Lei et al. | |
| 11,296,520 B2 | 4/2022 | Nook et al. | |
| 11,355,940 B2 | 6/2022 | Miller et al. | |
| 11,374,429 B2 | 6/2022 | Wood | |
| 11,394,232 B2 | 7/2022 | Nook et al. | |
| 2003/0011344 A1 | 1/2003 | Bertness et al. | |
| 2004/0239290 A1* | 12/2004 | Krieger | H01M 50/296 320/105 |
| 2005/0156564 A1 | 7/2005 | Krieger | |
| 2005/0280979 A1 | 12/2005 | Wu | |
| 2006/0108970 A1 | 5/2006 | Leasure et al. | |
| 2007/0247105 A1 | 10/2007 | Krieger et al. | |
| 2007/0247108 A1 | 10/2007 | Brown | |
| 2009/0108803 A1 | 4/2009 | Singarajan et al. | |
| 2009/0230783 A1* | 9/2009 | Weed | H02J 7/35 307/150 |
| 2010/0123432 A1 | 5/2010 | Schiestl | |
| 2010/0301800 A1 | 12/2010 | Inskeep | |
| 2011/0076168 A1 | 3/2011 | Irving et al. | |
| 2011/0298415 A1 | 12/2011 | Hetzroni | |
| 2014/0132069 A1 | 5/2014 | Ben Aharon | |
| 2014/0159509 A1 | 6/2014 | Inskeep | |
| 2014/0285009 A1 | 9/2014 | Lei | |
| 2015/0054336 A1 | 2/2015 | Xinfang | |
| 2015/0130400 A1 | 5/2015 | Inskeep | |
| 2015/0306965 A1 | 10/2015 | Bader | |
| 2015/0340907 A1 | 11/2015 | Lei | |
| 2016/0049819 A1 | 2/2016 | Butler et al. | |
| 2016/0072323 A1 | 3/2016 | Miller et al. | |
| 2018/0154775 A1 | 6/2018 | Liu et al. | |
| 2018/0198303 A1 | 7/2018 | Yang | |
| 2019/0173305 A1 | 6/2019 | Nook et al. | |
| 2020/0028368 A1 | 1/2020 | Nook et al. | |
| 2020/0126735 A1 | 4/2020 | Johnson et al. | |
| 2020/0136408 A1 | 4/2020 | Rumbaugh et al. | |
| 2020/0313455 A1* | 10/2020 | Adamany | H01M 10/0525 |
| 2021/0040940 A1* | 2/2021 | Zhu | B60S 5/046 |
| 2021/0075235 A1 | 3/2021 | Nook et al. | |
| 2021/0091578 A1* | 3/2021 | Miller | B60S 5/046 |
| 2021/0376640 A1 | 12/2021 | Lei | |
| 2022/0094192 A1 | 3/2022 | Wood | |
| 2022/0110494 A1 | 4/2022 | Liu | |
| 2022/0111756 A1 | 4/2022 | Ye et al. | |
| 2022/0123581 A1 | 4/2022 | Clarke et al. | |
| 2022/0158465 A1 | 5/2022 | Nook et al. | |
| 2022/0176836 A1 | 6/2022 | Mochizuki et al. | |
| 2023/0208135 A1* | 6/2023 | Hacker Davidson | F04D 25/0673 320/137 |
| 2024/0154412 A1* | 5/2024 | Nook | H02J 1/122 |

FOREIGN PATENT DOCUMENTS

| | | |
|---|---|---|
| CN | 104163164 A | 11/2014 |
| CN | 104253451 A | 12/2014 |
| CN | 103825331 B | 1/2017 |
| CN | 206116791 U | 4/2017 |
| CN | 207382204 U | 5/2018 |
| CN | 207743908 U | 8/2018 |
| CN | 208062856 U | 11/2018 |
| CN | 106100010 B | 12/2018 |
| CN | 109217706 A | 1/2019 |
| CN | 208874482 U | 5/2019 |
| CN | 209658261 U | 11/2019 |
| CN | 111463851 A | 7/2020 |
| CN | 112260355 A | 1/2021 |
| CN | 112688380 A | 4/2021 |
| CN | 214479736 U | 10/2021 |
| CN | 214741917 U | 11/2021 |
| CN | 214850575 U | 11/2021 |
| CN | 215897489 U | 2/2022 |
| CN | 114336924 A | 4/2022 |
| CN | 216215968 U | 4/2022 |
| CN | 216413934 U | 4/2022 |
| CN | 114552684 A | 5/2022 |
| CN | 217010728 U | 7/2022 |
| WO | WO2017066916 A1 | 4/2017 |
| WO | WO2021154461 A1 | 8/2021 |
| WO | WO2022016234 A1 | 1/2022 |
| WO | WO2022063275 A1 | 3/2022 |

* cited by examiner

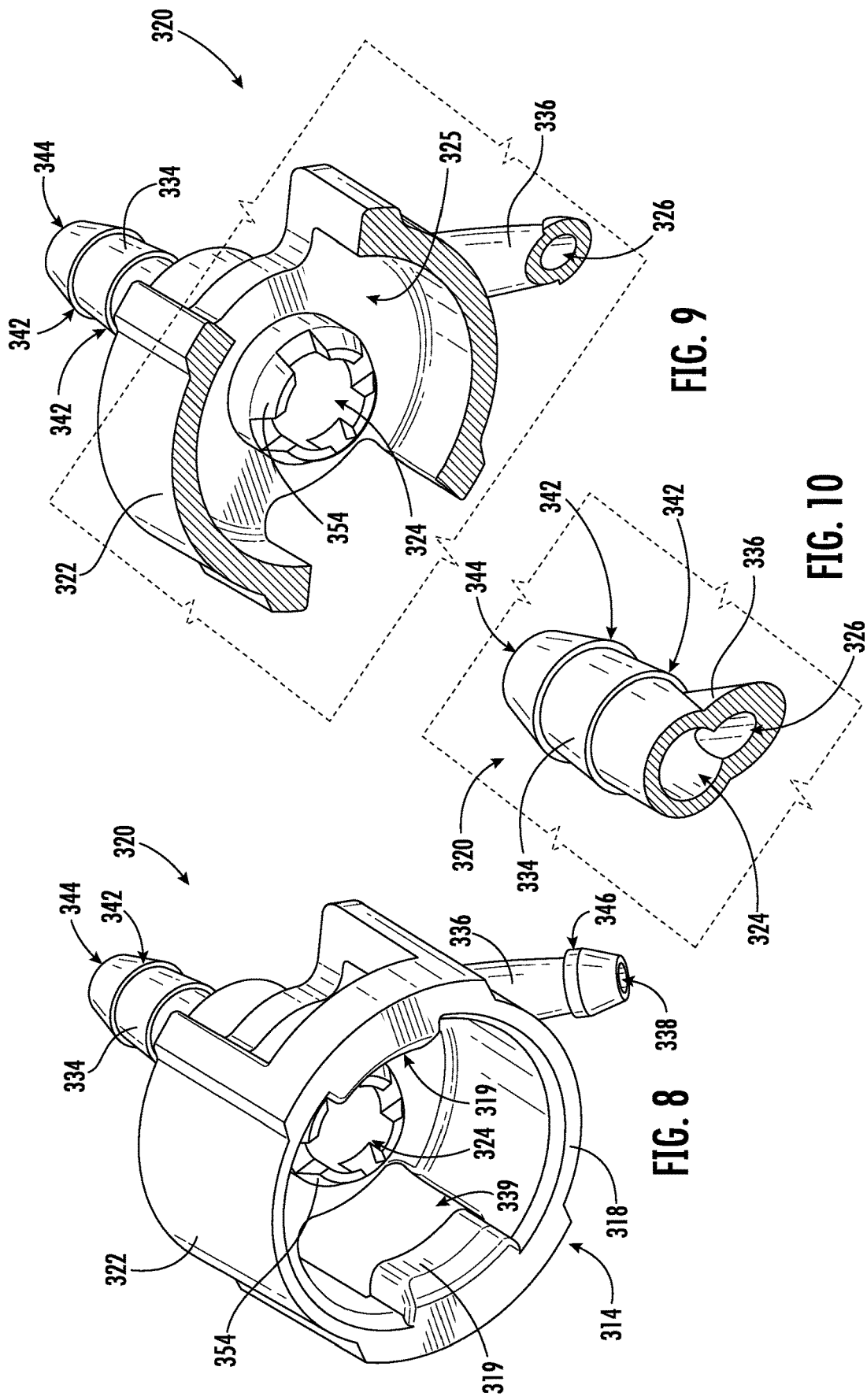

FLUID AND POWER PROVISION APPARATUS

FIELD

The present disclosure relates generally to battery booster or jump starter devices, and more particularly to portable battery booster or jump starter devices.

BACKGROUND

Portable battery booster and jump starter devices are used for providing energy to a battery, such as to start a vehicle or to charge a vehicle battery. Additional vehicle issues may include loss of tire pressure, requiring air to be supplied to a tire. Separate devices may be utilized for supplying air and energy. However, utilizing separate devices requires a user to ensure that each device has stored energy for operating each device. Accordingly, there is a need for apparatuses and structures for battery booster and air supply devices.

BRIEF DESCRIPTION

Aspects and advantages of the invention in accordance with the present disclosure will be set forth in part in the following description, or may be understood from the description, or may be learned through practice of the technology.

An aspect of the present disclosure is directed to a fluid and power provision apparatus. The apparatus includes a power provision device and a pump assembly. The pump assembly includes a motor, a transmission system, a piston assembly, and a collar assembly. The piston assembly includes a piston sleeve, a piston, and a piston arm operably coupled to the piston and the transmission system to transmit energy from the motor to articulate the piston within the piston sleeve. The collar assembly forms a collar plenum, a first flowpath, and a second flowpath. The piston sleeve extends at least in part into the collar plenum. The first flowpath extends in fluid communication from the collar plenum to a fluid supply outlet. The second flowpath extends in fluid communication from an interior of the apparatus to the first flowpath.

Another aspect of the present disclosure is directed to a battery booster and air supply apparatus. The apparatus includes a base at least partially forming an interior of the apparatus. A power provision device includes a capacitor positioned at the interior of the apparatus. The capacitor is configured to transfer energy through a pair of electrical conduits and respective energy transfer attachments. A fluid supply apparatus includes a pump assembly positioned at the interior of the apparatus. The pump assembly includes a motor, a transmission system, a piston assembly, and a collar assembly. An air supply conduit extending in fluid communication from the piston assembly. An attachment end is affixed to the air supply conduit distal to the pump assembly. The piston assembly includes a piston sleeve, a piston, and a piston arm operably coupled to the piston and the transmission system to transmit energy from the motor to articulate the piston within the piston sleeve. The collar assembly forms a collar plenum, a first flowpath, and a second flowpath. The piston sleeve extends at least in part into the collar plenum. The first flowpath extends in fluid communication from the collar plenum to the air supply conduit. The second flowpath extends in fluid communication from an interior of the apparatus to the first flowpath.

Yet another aspect of the present disclosure is directed to a battery booster apparatus. The apparatus includes an outer body forming an interior, wherein a wing forming a recessed platform extends from the outer body; and an energy transfer attachment operably coupled to an electrical conduit, the electrical conduit operably coupled to a power provision device positioned at the interior, the energy transfer attachment including a pair of clamp bodies connected in hinged arrangement at a hinge, the clamp body including a handle and a connection end, wherein the hinge is positioned between the handle and the connection end, and wherein a terminal interface including a conductive material is positioned at the connection end.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which:

FIG. 8 is a perspective view of a collar assembly of the apparatus in accordance with aspects of the present disclosure;

FIG. 9 is a cutaway perspective view of the collar assembly of FIG. 7 in accordance with aspects of the present disclosure;

FIG. 10 is a cutaway perspective view of the collar assembly of FIG. 7 in accordance with aspects of the present disclosure;

Figure 1:
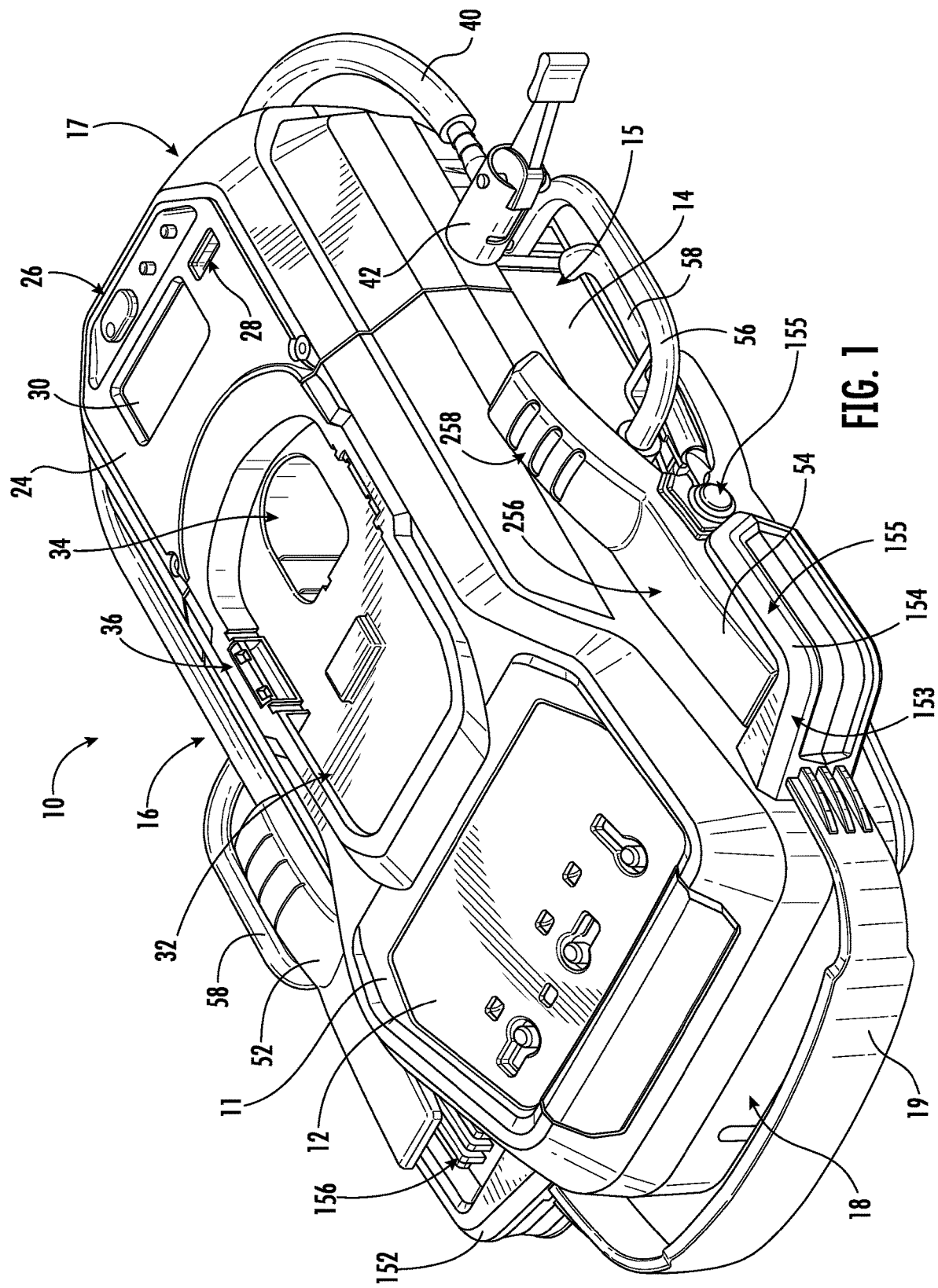
FIG. 1 is a perspective view of an embodiment of a fluid and power provision apparatus in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Embodiments of a combined air and power provision apparatus are provided. Embodiments of the apparatus depicted and described herein include structures allowing for including a pump assembly and an energy or power provision device into an interior of a single, portable apparatus. Embodiments of apparatuses such as provided herein include portable, relatively compact, and lightweight battery booster and air supply devices that may allow for stored energy to operate each of a battery booster device and an air supply device.

Figure 2:
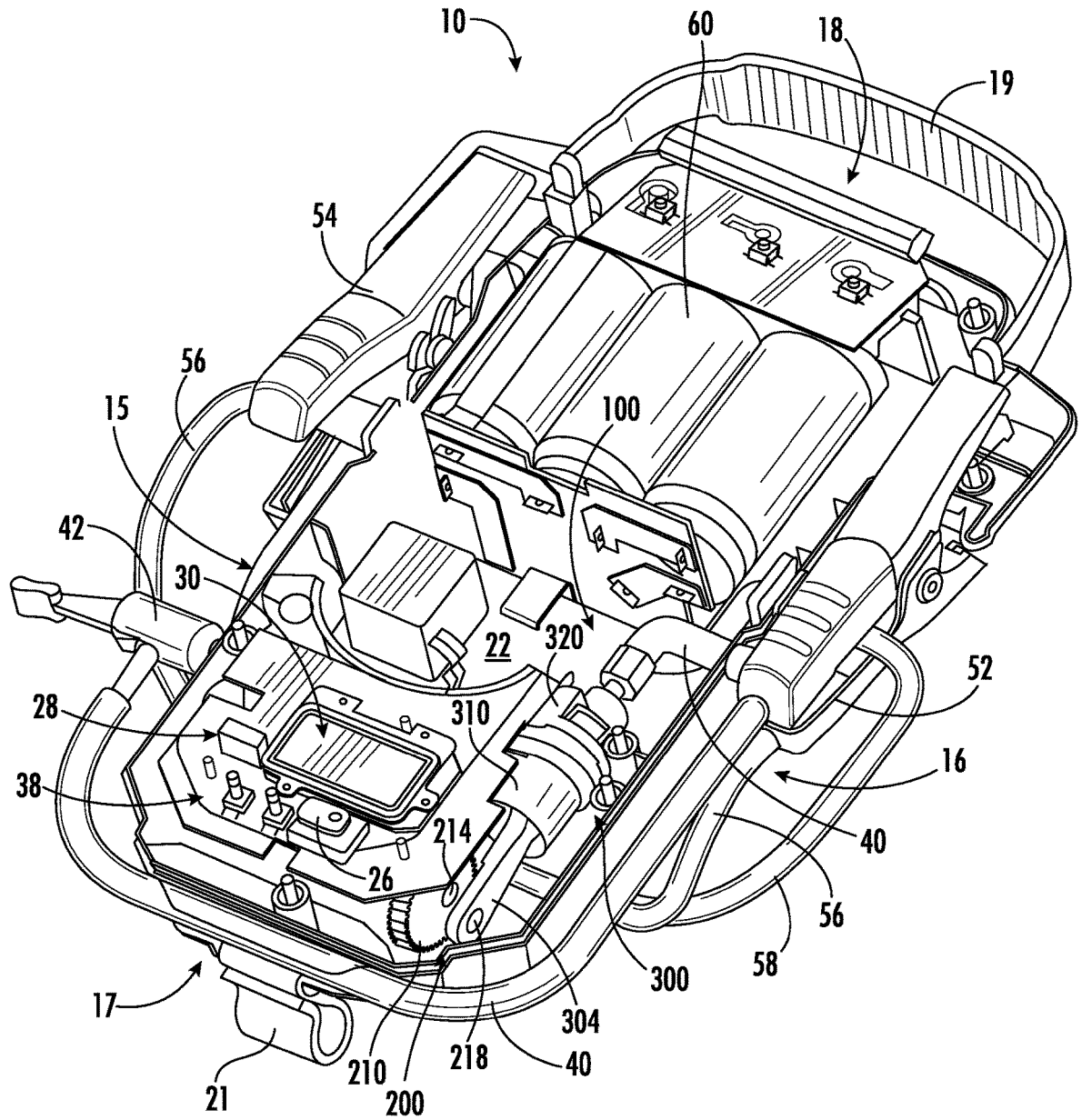
FIG. 2 is a perspective view of the apparatus of FIG. 1 in which an outer cover is transparent and depicting internal components of the apparatus in accordance with aspects of the present disclosure.

Referring to the drawings, FIG. 1 provides a perspective view of an embodiment of an air and power provision apparatus 10. FIG. 2 provides a perspective view of the apparatus 10 of FIG. 1 in which an outer cover 12 is removed and allowing components within an interior 22 of the apparatus 10 to be viewed. An outer body 11 forms interior 22 at which operational components for a power provision device 90 and a pump assembly 100 are provided. Outer body 11 generally includes a base 14 forming walls extending between a first side 15 and a second side 16 laterally separated from one another and a first end 17 and a second end 18 longitudinally separated from one another. Base 14 may form a trough or basket including mounting features, snaps, fastener openings, or other retainer features configured to receive, retain, mount, or otherwise secure components within interior 22 (FIG. 2).

The outer body 11 of apparatus 10 includes base 14 and outer cover 12 together substantially enclosing interior 22 (FIG. 2) and components generally positioned or secured within interior 22. The outer cover 12 may further include a separable controller cover 24. Controller cover 24 includes control interfaces 26 operably coupled a controller 38 configured to command operation of electrical and electronic components of the apparatus 10, such as further described herein. Control interfaces 26 may include buttons, switches, touchscreen interfaces, or other control surfaces. Control cover 24 may further include a communications port 28. The communications port 28 includes any appropriate interface for receiving, transmitting, or both, signals to or from electrical and electronic components or controllers. In some embodiments, communications port 28 forms any appropriate type of universal serial bus (USB) port, or other type of communications interface.

Controller cover 24 may further include a display screen 30 configured to provide visual signal to a user, such as signals communicating to the user an operating mode (e.g., power provision mode or air supply mode), an operating state (e.g., standby, discharging energy, receiving energy, voltage determination, operating errors, etc.), an on/off status, or other applicable indications of operation, state, health, safety, or function at the apparatus 10 or devices operably attached to apparatus 10, such as a vehicle battery, a power supply, or vessel configured to receive air (e.g., a vehicle tire, an inflatable structure, etc.).

Outer cover 12 may form a power supply interface 32 configured to receive a power supply. The power supply interface 32 includes a power supply port 34 configured to receive an energy cell, battery, capacitor, or energy input plug. In a particular embodiment, the power supply interface 32 includes retention features 36, such as snaps or clips, configured to receive a detachable energy cell or battery. In some embodiments, the power supply includes an 18-volt lithium ion battery. In other embodiments, any appropriate voltage or amperage power supply may be utilized.

Referring to FIGS. 1-2, apparatus 10 may further include a strap 19 extending from base 14. Further embodiments of apparatus 10 may include a clip 21 extending from base 14. In the embodiment depicts in FIGS. 1-2, strap 19 extends from the second end 18 of apparatus 10 and clip 21 extends from first end 17. In various embodiments, clip 21 extends from any desired location along which an air supply conduit 40 extends from interior 22 to an attachment end 42. Clip 21 is configured to releasably affix air supply conduit 40 to an exterior of apparatus 10. Attachment end 42 may form any appropriate fitting for attaching to a valve to provide air to a vessel, such as a vessel forming a tire or tube, ball, or inflatable device. In various embodiments, attachment end 42 forms a Presta valve (e.g., PV valve), a French valve (e.g., FV valve), a Sclaverand valve, a diverter valve (e.g., DV valve), a Schrader valve (e.g., SV valve), an American valve (e.g., AV valve), a Dunlop valve, or other appropriate type of valve or flow control device.

Referring still to FIGS. 1-2, apparatus 10 includes a pair of energy transfer attachments 52, 54 configured to desirably and releasably couple to respective terminals, ports, or other energy transfer attachments. In various embodiments, attachments 52, 54 form clamps or clips (e.g., alligator clamps) configured to couple onto electrode terminals at or operatively coupled to a vehicle battery or other energy receiving or transfer terminal. Coupled to each respective attachment 52, 54 is an electrical conduit 56, 58 configured to transfer energy between a capacitor 60 and the energy transfer attachments 52, 54. A first energy transfer attachment 52 may form a positive terminal and a second energy transfer attachment 54 may form a negative terminal. However, it should be appreciated that the first energy transfer attachment 52 may form a negative terminal and the second energy transfer attachment 54 may form a positive terminal.

In various embodiments, capacitor 60 is a device configured to store electrical energy. In particular embodiments, capacitor 60 is a passive electronic component including terminals and configured to store electrical energy in an electric field. Capacitor 60 may include any appropriate type of electrical conductor, such as, but not limited to, metallic surfaces separated by a dielectric medium. Capacitor 60 may include any type of conductor and dielectric medium suitable for portable vehicle starters or chargers. Energy stored by capacitor 60 is selectively releasable through conduits 56, 58 and energy transfer attachments 52, 54 when connected to corresponding terminals at a battery, such as a vehicle battery or other appropriate battery device to which electrical energy transfer is desired.

Figure 3:
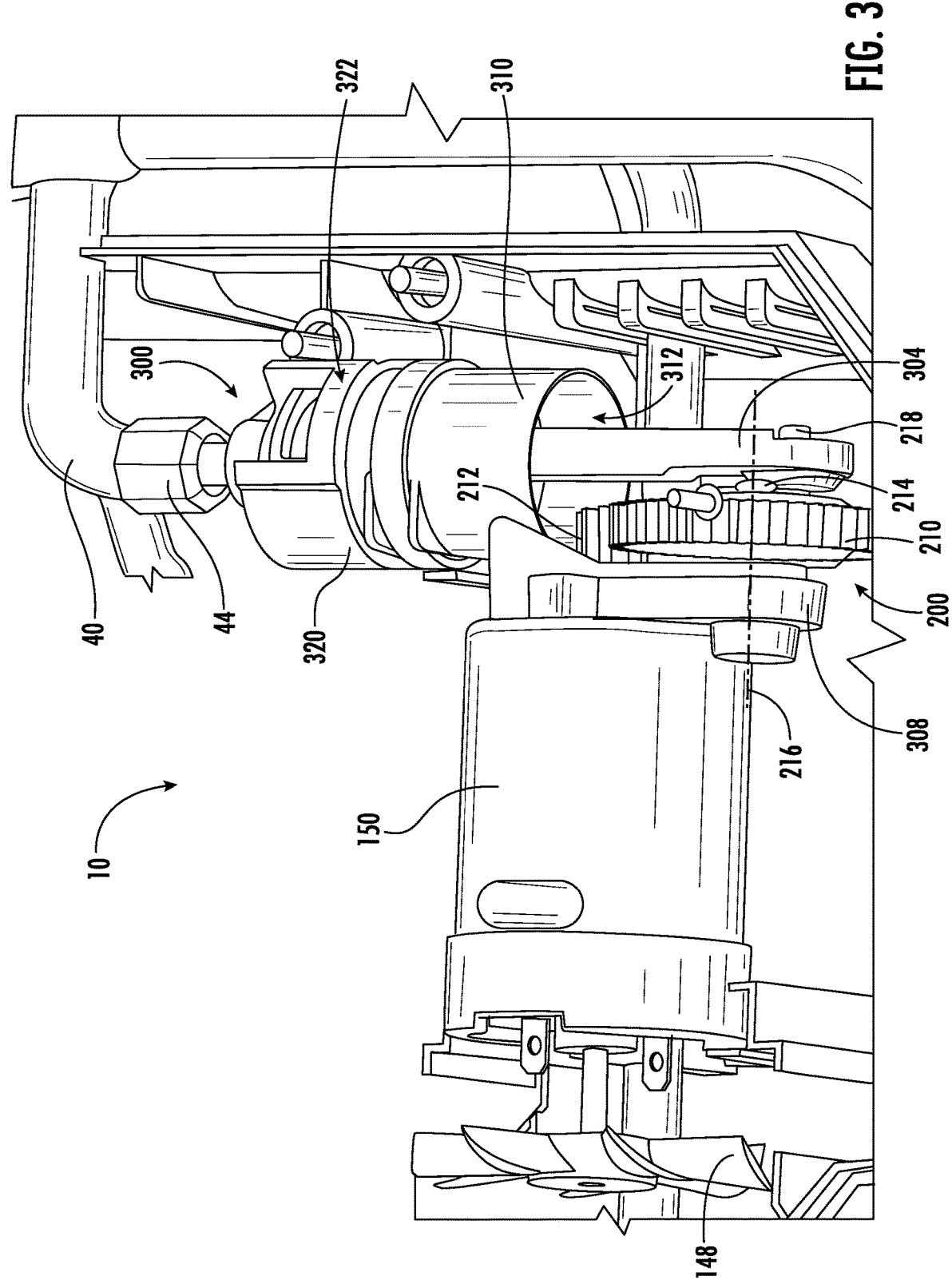
FIG. 3 is a detailed perspective view of a portion of the apparatus in accordance with aspects of the present disclosure.
Figure 4:
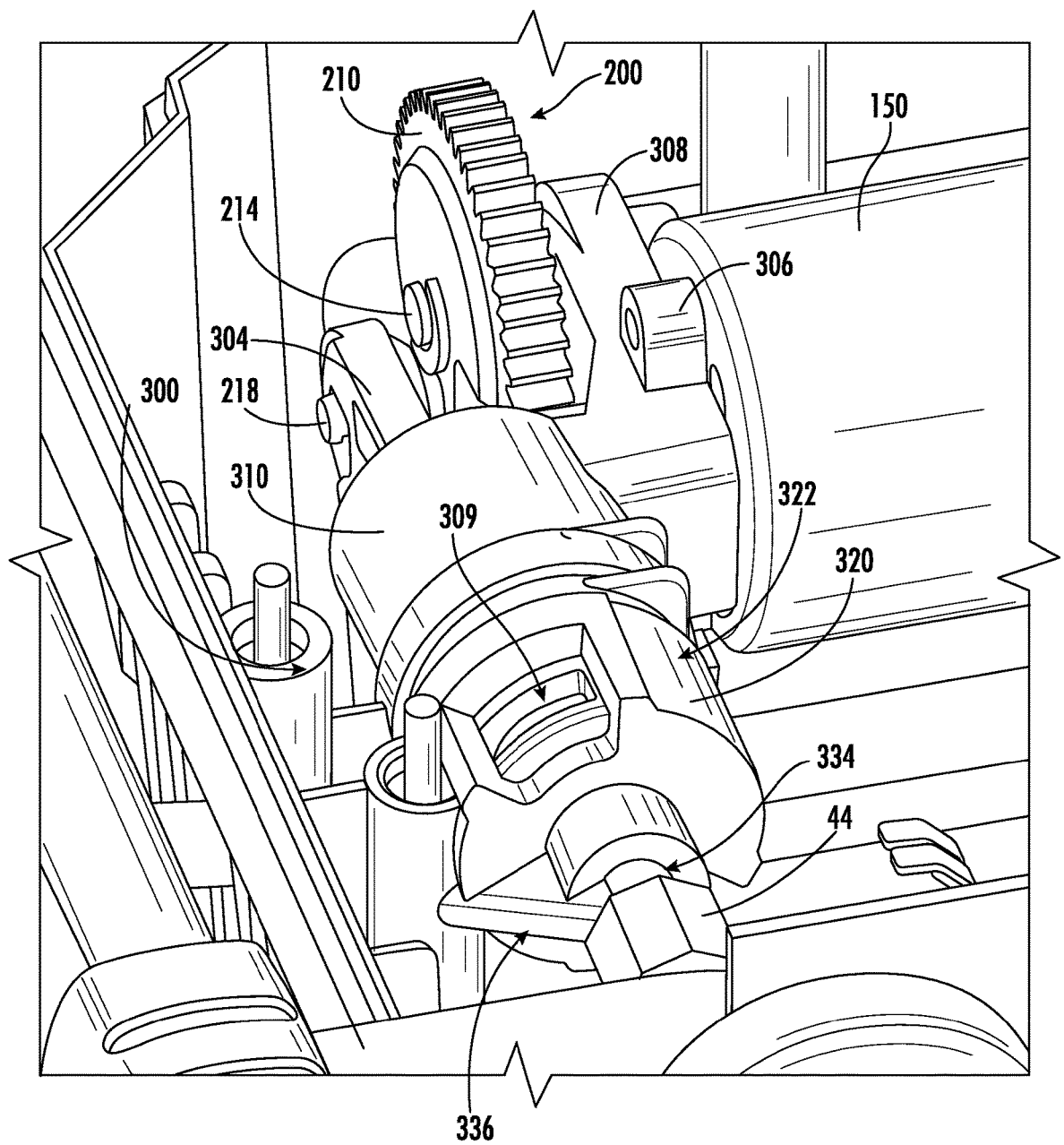
FIG. 4 is a detailed perspective view of a portion of the apparatus in accordance with aspects of the present disclosure.

Referring now to FIGS. 3-4, detailed perspective views of a portion of the apparatus 10 depict a pump assembly 100. In various embodiments, pump assembly 100 includes a motor 150 operably coupled to a piston assembly 300 fluidly coupled to air supply conduit 40 to flow air through the air supply conduit 40 to the attachment end 42. In various embodiments, apparatus 10 may include a fan 148 operably coupled motor 150 to flow air, such as cooling air for motor 150 or electrical or electronic components at interior 22, or air to be received into air supply conduit 40, or both. In some embodiments, motor 150 is operably coupled to a transmission system 200 to transmit energy to piston assembly 300.

Embodiments of apparatus 10 are configured to transmit energy from the capacitor 60 (FIG. 2) to drive motor 150. In some embodiments, motor 150 is operatively coupled to transmission system 200 to drive piston assembly 300. In some embodiments, transmission system 200 includes a gear 210 operably coupled to motor 150 to receive energy from the motor 150 and transfer energy to piston assembly 300. Gear 210 may mesh at an output gear 212 rotatably coupled to an output shaft at motor 150. Gear 210 is rotatable at a central axis 216 by a shaft 214 extending through gear 210. Shaft 214 is coupled to a housing 308 to establish axis 216. In particular, shaft 214 extends into housing 308 and is allowed to rotate along axis 216. Gear 210 is coupled to shaft 214 to correspondingly rotate along axis 216 when energy from motor 150 drives gear 210 via output gear 212 and a gear mesh between gears 210, 212.

Figure 5:
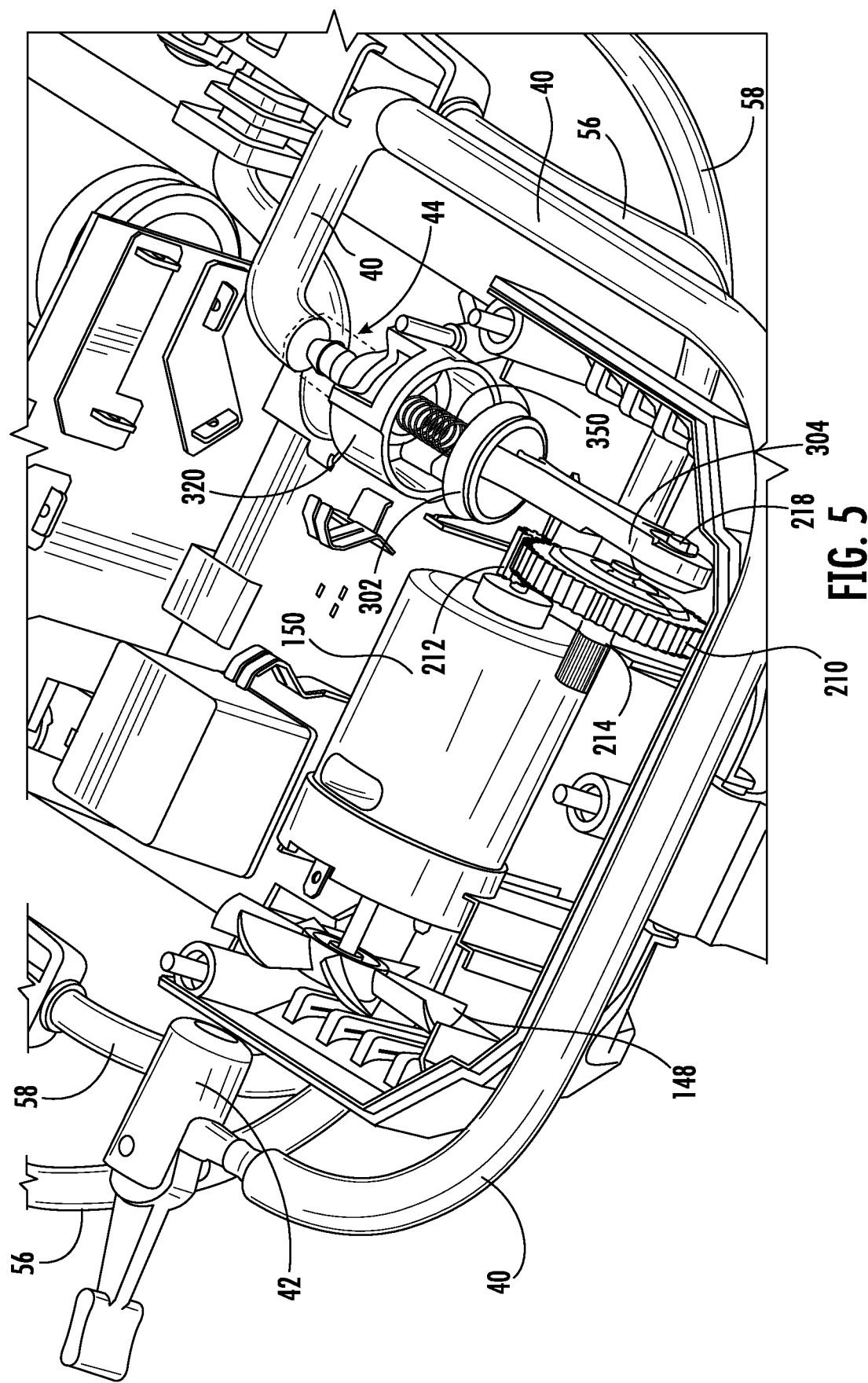
FIG. 5 is a detailed perspective view of a portion of the apparatus in accordance with aspects of the present disclosure.
Figure 6:
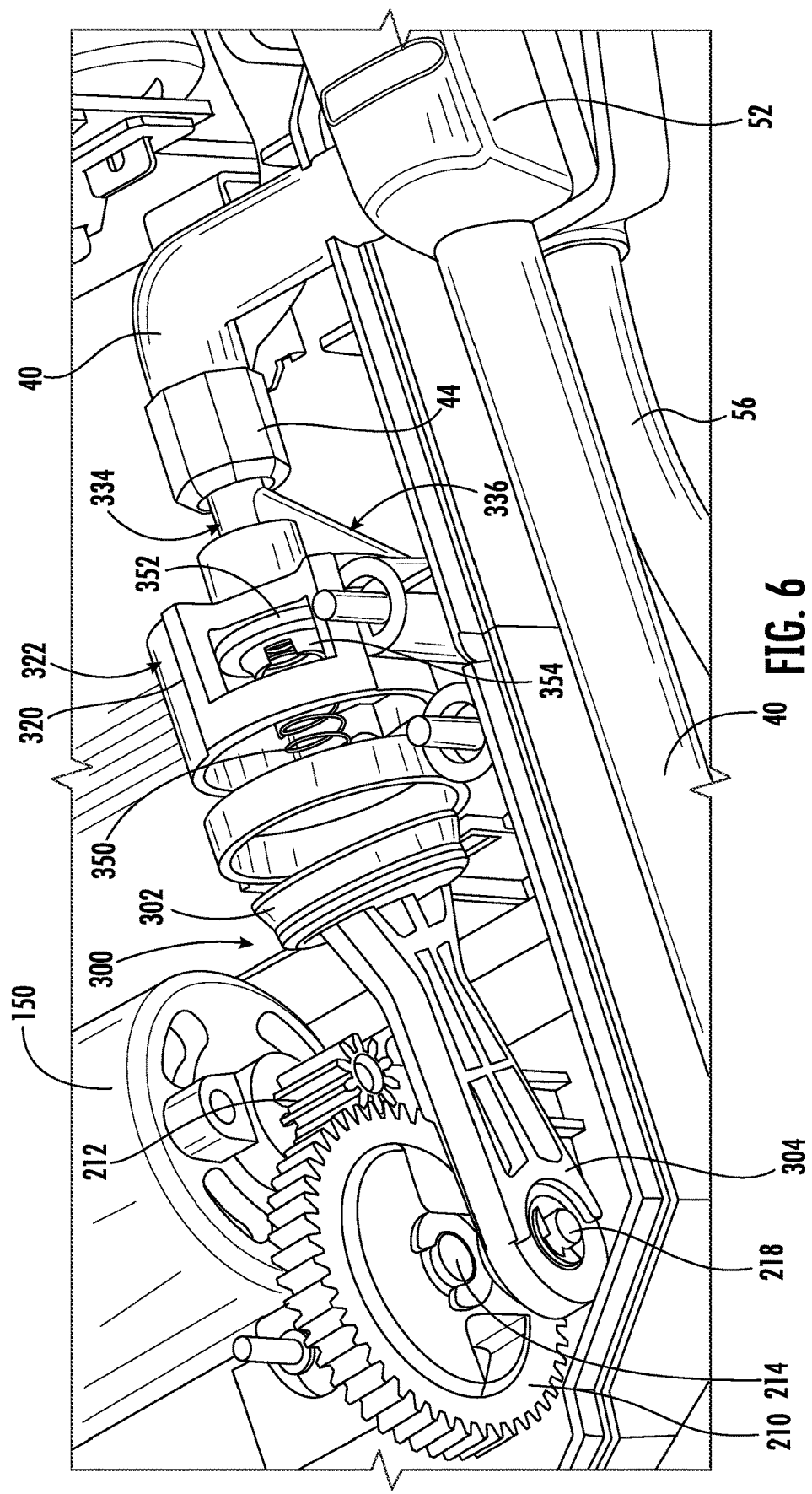
FIG. 6 is a detailed perspective view of a portion of the apparatus in accordance with aspects of the present disclosure.
Figure 7:
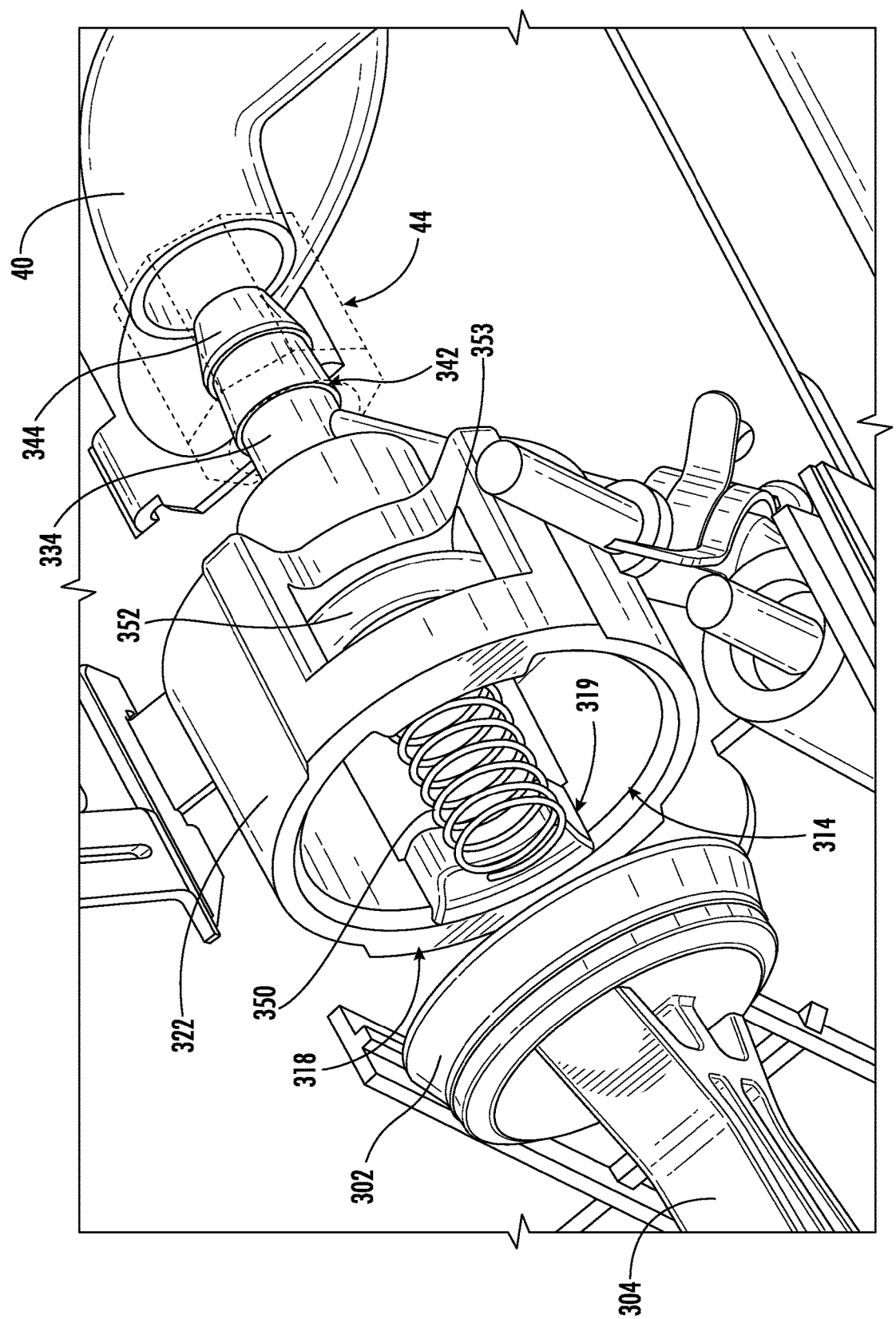
FIG. 7 is a detailed perspective view of a portion of the apparatus in accordance with aspects of the present disclosure.

Referring now to FIGS. 5-7, perspective views of portions of apparatus 10 including portions of pump assembly 100 are provided. FIGS. 5-7 omit for the sake of clarity some components otherwise depicted in FIGS. 1-4. Referring to FIGS. 1-7, piston assembly 300 includes a piston sleeve 310 forming a piston chamber 312 (FIG. 3) within the piston sleeve 310. Piston assembly 300 includes a piston 302 connected to a piston arm 304. Piston arm 304 is operably coupled to transmission system 200 to receive motive energy to articulate the piston 302 within the piston chamber 312 formed by piston sleeve 310. In some embodiments, piston arm 304 is coupled to gear 210 through rotatable shaft 218. Shaft 218 is positioned off-center from axis 216 at gear 210, such as to allow shaft 218 to rotate along a circumferential path around central axis 216. Piston arm 304 is allowed to move, such as to slide with movement of shaft 218, to covert rotational movement of the shaft 218 and gear 310 to linear movement of piston arm 304 and piston 302 within piston sleeve 310.

In some embodiments, piston sleeve 310 and housing 308 together form a unitary, monolithic body. Accordingly, the unitary, monolithic body includes a substantially cylindrical piston sleeve 310 portion through which piston 302 and piston arm 304 extend and a housing 308 portion into which shaft 214 is supported. The unitary monolithic body may further include one or more mount interfaces 306 configured to affix to apparatus 10. Mount interface 306 may include an opening configured to receive a fastener, such as a screw, bolt, pin, tie-rod, or other mechanical fastener. In some embodiments, mount interface 306 is positioned adjacent to motor 150 to allow a fastener to extend through mount interface 306 to connect to motor 150. In a still particular embodiment, mount interface 306 is connected to the housing 308. It should be appreciated that additional or alternative mount interfaces may be included to couple, affix, or otherwise secure housing 308 within interior 22 of apparatus 10.

Referring still to FIGS. 1-7, and further depicted in detailed portions in FIGS. 8-10, pump assembly 100 includes a collar assembly 320. FIG. 8 depicts an embodiment of collar assembly 320. FIGS. 9-10 depict sectional views of the collar assembly of FIG. 8, further displaying details further described herein. Referring to FIGS. 1-7, collar assembly 320 at least partially surrounds piston sleeve 310. In various embodiments, collar assembly 320 includes a substantially cylindrical portion 322 at least partially surrounding piston sleeve 310 when piston sleeve 310 is positioned within collar assembly 320.

Depicted in further detail in regard to FIGS. 8-10, collar assembly 320 forms a first flowpath 324 extending in fluid communication from the collar plenum 314 to an air supply outlet, such as at an interface of the first flowpath 324 and the air supply conduit 40. In some embodiments, collar assembly 320 includes a first manifold 334 extending from the cylindrical portion 322. First manifold 334 forms an air supply outlet at a terminal end at which air supply conduit 40 is connectable to the first manifold 334 to receive a flow of air from pump assembly 300. First manifold 334 forms, at least in part, the first flowpath 324. In some embodiments, cylindrical portion 322 forms a portion of first flowpath 324.

In some embodiments, collar assembly 320 forms a second flowpath 326 extending in fluid communication to the first flowpath 324. In some embodiments, collar assembly 320 includes a second manifold 336 extending from the first manifold 334. In still some embodiments, second manifold 336 forms the second flowpath 326. In various embodiments, an opening 338 is positioned to allow a flow of air to enter into second flowpath 326 and flow into first flowpath 324 and egress into air supply conduit 40. In some embodiments, opening 338 is formed at the second manifold 336 and positioned in fluid communication with interior 22 of housing 10. In another embodiment, opening 338 is positioned in fluid communication with an exterior of housing 10.

In various embodiments, first manifold 334 forms a first nozzle 344 at which air supply conduit 40 is connectable to receive a flow of air from pump assembly 300. In still various embodiments, second manifold 336 forms a second nozzle 346 through which air is received through opening 338 into second flowpath 326. First manifold 334 may form raised surfaces 342, such as walls or ridges, configured to receive a fitting 44 (FIGS. 4-6) at a proximate end of air supply conduit 40. Referring to FIGS. 4-6, fitting 44 may include any appropriate fastener configured to couple the air supply conduit 40 to the first manifold 334. In particular, fitting 44 is configured to attach to air supply conduit 40 and raised surfaces 342 secure a position of the air supply conduit 40 relative to the first manifold 334. In various embodiments, fitting 44 forms a ferrule or sleeve configured to crimp or press around the air supply conduit 40 and the first manifold 334. Raised surfaces 342, nozzle 344, or both may form surfaces at which fitting 44 is attachable.

Figure 14:
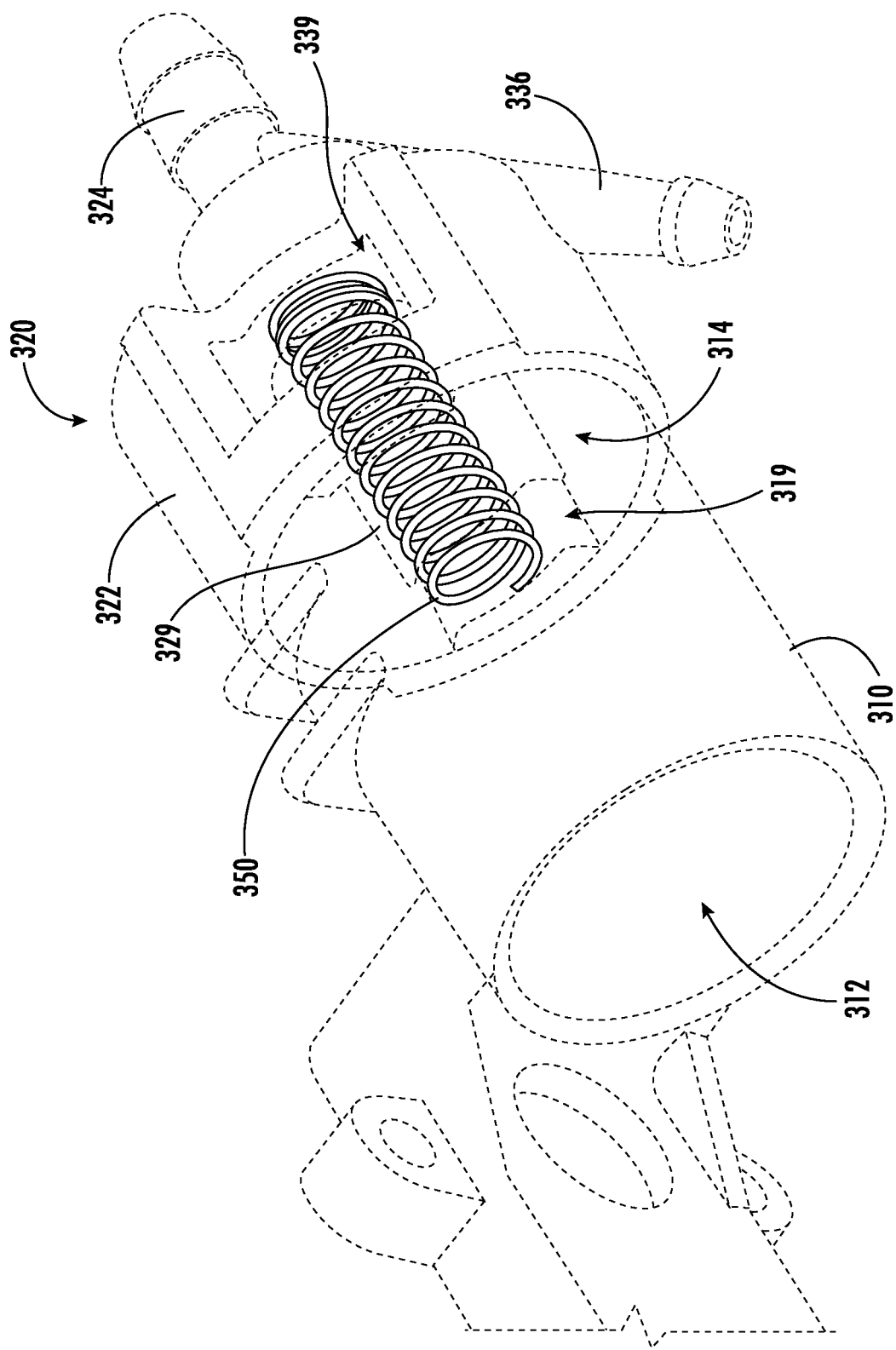
FIG. 14 is a perspective view of a portion of the apparatus in accordance with aspects of the present disclosure.

Referring now to FIGS. 7-10, collar assembly 320 forms a collar plenum 314 at which piston sleeve 310 is received. Collar plenum 314 is formed, at least in part, by cylindrical portion 322 of collar assembly 320. Collar assembly 320 forms an end face 318 distal to an end at which air supply conduit 40 attaches to first manifold 334. Referring to FIGS. 7-8, collar assembly 320 forms a raised surface or key 319 extending radially into the collar plenum 314. Key 319 at collar assembly 320 corresponds to a groove 309 (FIG. 4) and key 329 (FIG. 14) at piston sleeve 310. Groove 309 extends radially inward and along a circumferential arc, such as to form raised surface or key 329 at the piston sleeve 310 within the collar plenum 314. A stop wall is formed at ends of the arc formed at groove 309. Assembly of piston sleeve 310 into collar assembly 320 may include sliding the piston sleeve 310 into the collar plenum 314, and rotating the piston sleeve 310 or the collar assembly 320 to align the keys 319, 329, such as depicted at FIG. 14. In various embodiments (e.g., depicted in FIG. 8), an opening 339 is formed along an arc at the cylindrical portion 322 of collar assembly 320. Opening 339 may allow groove 309 or key 329 at piston sleeve 310, or particularly a piston cylinder 317 extending from piston sleeve 310, to position alongside key 319 at collar assembly 320.

Figure 11:
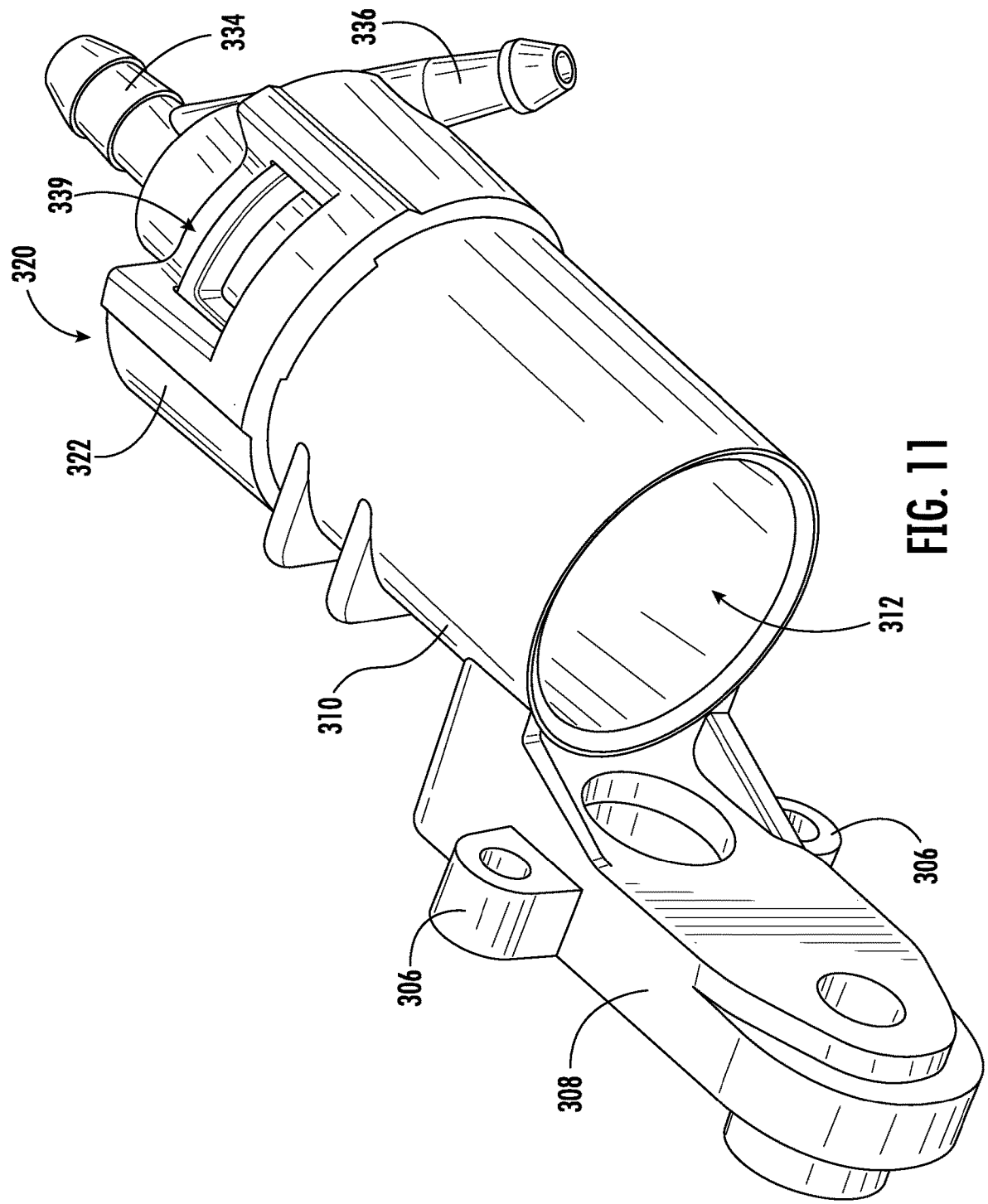
FIG. 11 is a perspective view of a portion of the apparatus in accordance with aspects of the present disclosure.
Figure 12:
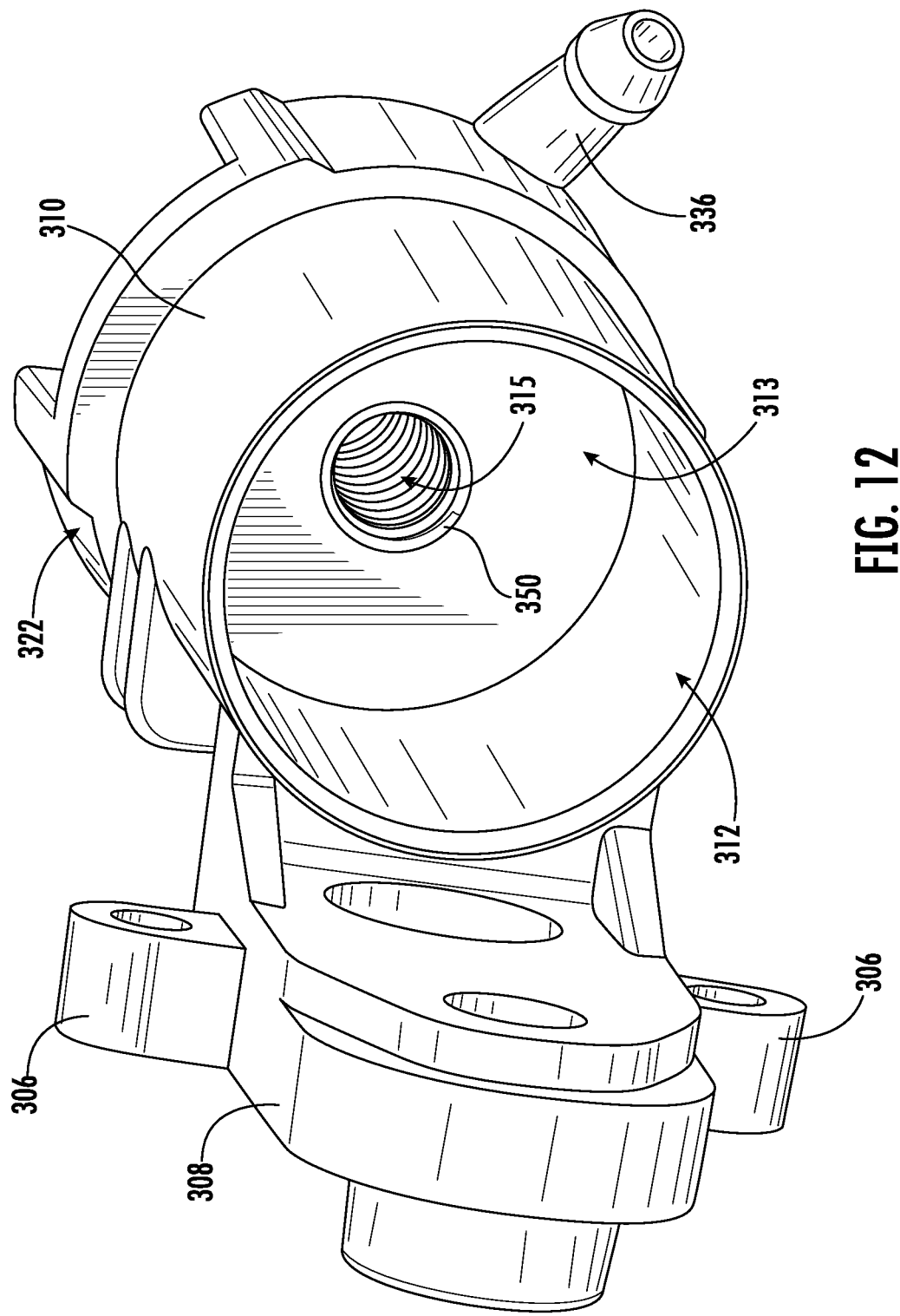
FIG. 12 is a perspective view of a portion of the apparatus in accordance with aspects of the present disclosure.

Referring now to FIGS. 6-9, collar assembly 320 forms teeth 354 configured to receive and retain a spring 350 (FIGS. 6-7) within collar plenum 314. Teeth 354 extend from an end wall 325 substantially co-directional to an extension of spring 350. Teeth 354 are positioned around a fluid interface between collar plenum 314 and first flowpath 324. First flowpath 324 extends through end wall 325 in fluid communication with collar plenum 314. Perspective views of a sub-assembly of the collar assembly 320, piston sleeve 310, housing 308, and spring 350 are provided in FIGS. 11-13. Piston sleeve 310 forms a wall 313 forming an opening 315 through which spring 350 at least partially extends. Wall 313 is positioned within the piston sleeve 310, such as to form the piston chamber 312 at a first side proximate to the piston arm 304, and a second side proximate to the collar assembly 320. In some embodiments, spring 350 attaches to wall 313. As motor 150 articulates piston arm 304 and piston 302 within piston chamber 312, pressure changes force air to pump through opening 315. Spring 350 may allow for reactive forces to allow the piston sleeve 310 to maintain position, or articulate within a desired tolerance, relative to collar assembly 320. Pressure changes from articulation of piston 302 within piston chamber 312 cause air to pull through second flowpath 326 and into first flowpath 324 to the air supply conduit 40.

In various embodiments, collar assembly 320 is formed as a single, unitary, monolithic component. In some embodiments, collar assembly 320 includes cylindrical portion 322, first manifold 334, and second manifold 336 formed as a unitary, monolithic component. In still particular embodiments, collar assembly 320 includes cylindrical portion 322, first manifold 334, second manifold 336, nozzles 344, 346, and transition portions and other surfaces therebetween formed as a unitary, monolithic component. Collar assembly 320 may be formed from any appropriate molding, extrusion, or additive process, or a machining process, or combinations thereof.

Figure 13:
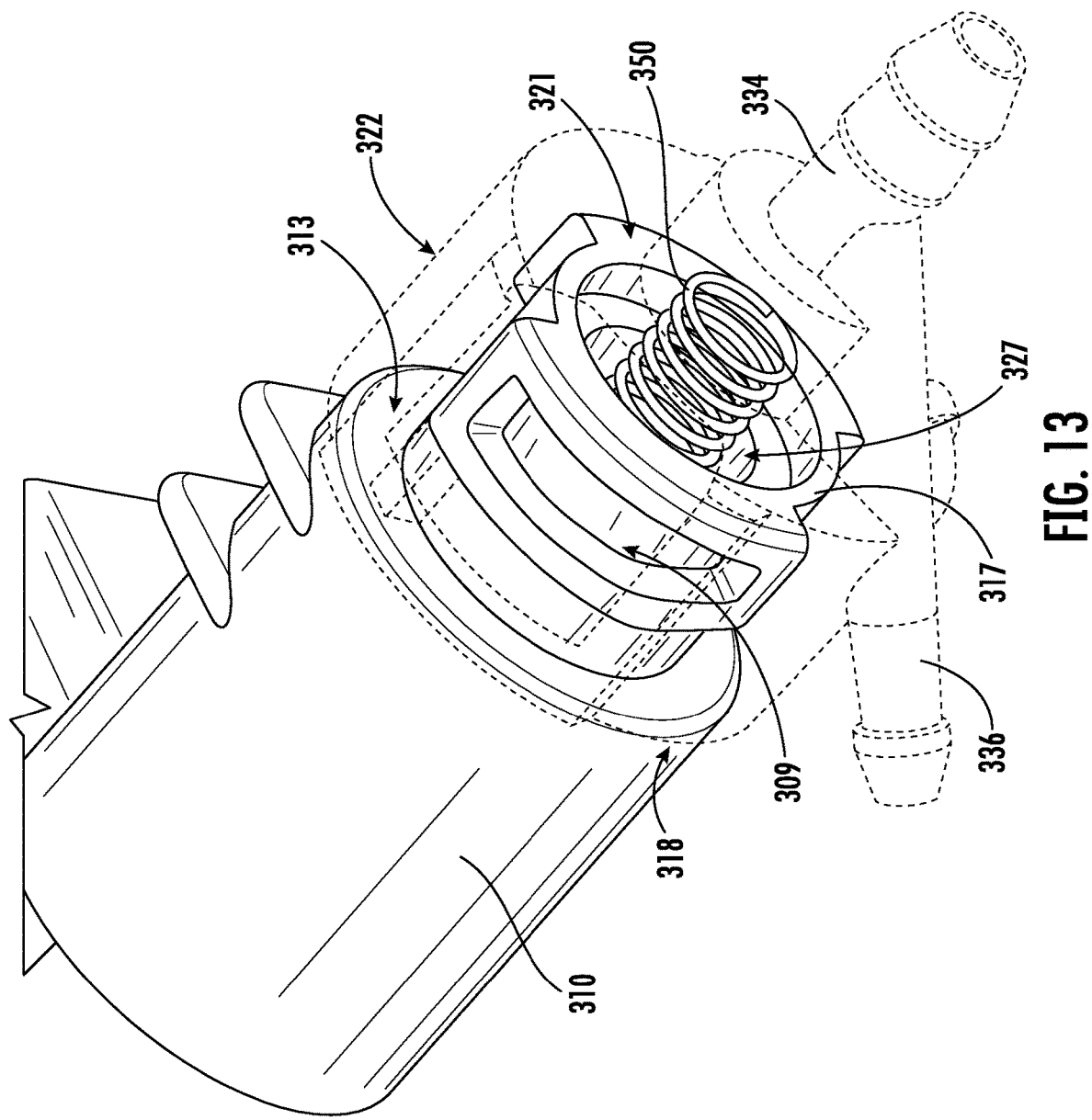
FIG. 13 is a perspective view of a portion of the apparatus in accordance with aspects of the present disclosure.

Referring to FIG. 13, piston sleeve 310 may further include a piston cylinder 317 extending from wall 313 into the collar plenum 314. Piston cylinder 317 further attaches at an end 321 to collar assembly 320 at end wall 325 (FIG. 9). As further depicted in FIGS. 5-7, a seal 352 may be positioned at end wall 325 around spring 350 and teeth 354. FIG. 13 further depicts piston cylinder 317 extending into the collar plenum 314 and forming a piston plenum 327 within the piston cylinder 317. Piston plenum 327 extends from wall 313 to an interface with end wall 325 at collar assembly 320. Spring 350 extends within the piston plenum 327. Spring 350 may expand and compress between wall 313 and end wall 325. Seal 352 may discourage or inhibit fluid leaks or fluid communication between the piston plenum 327 and the surrounding collar plenum 314.

Figure 15:
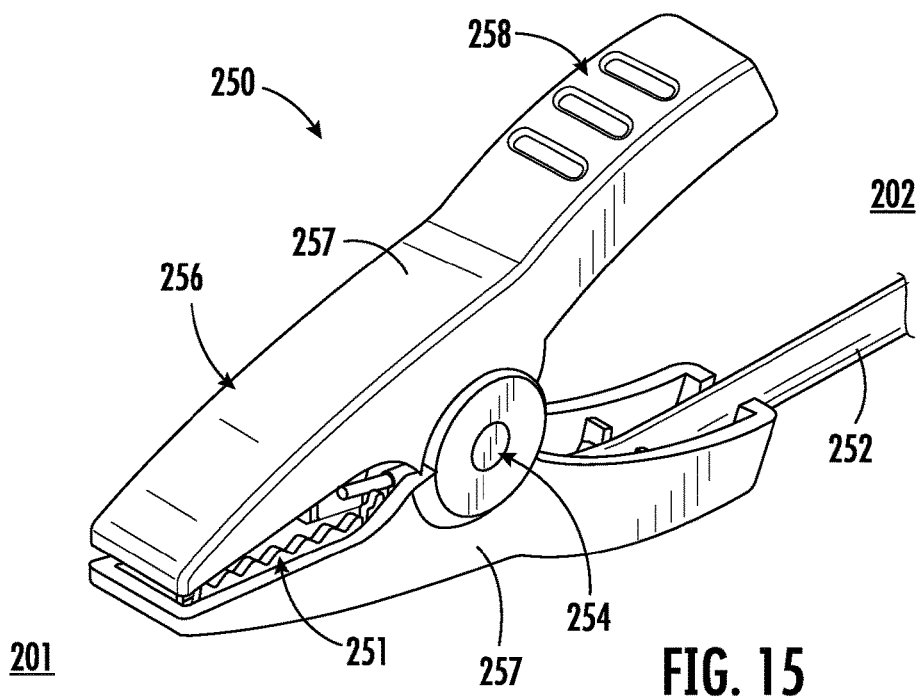
FIG. 15 is a perspective view of an exemplary embodiment of an energy transfer attachment in accordance with aspects of the present disclosure.
Figure 16:
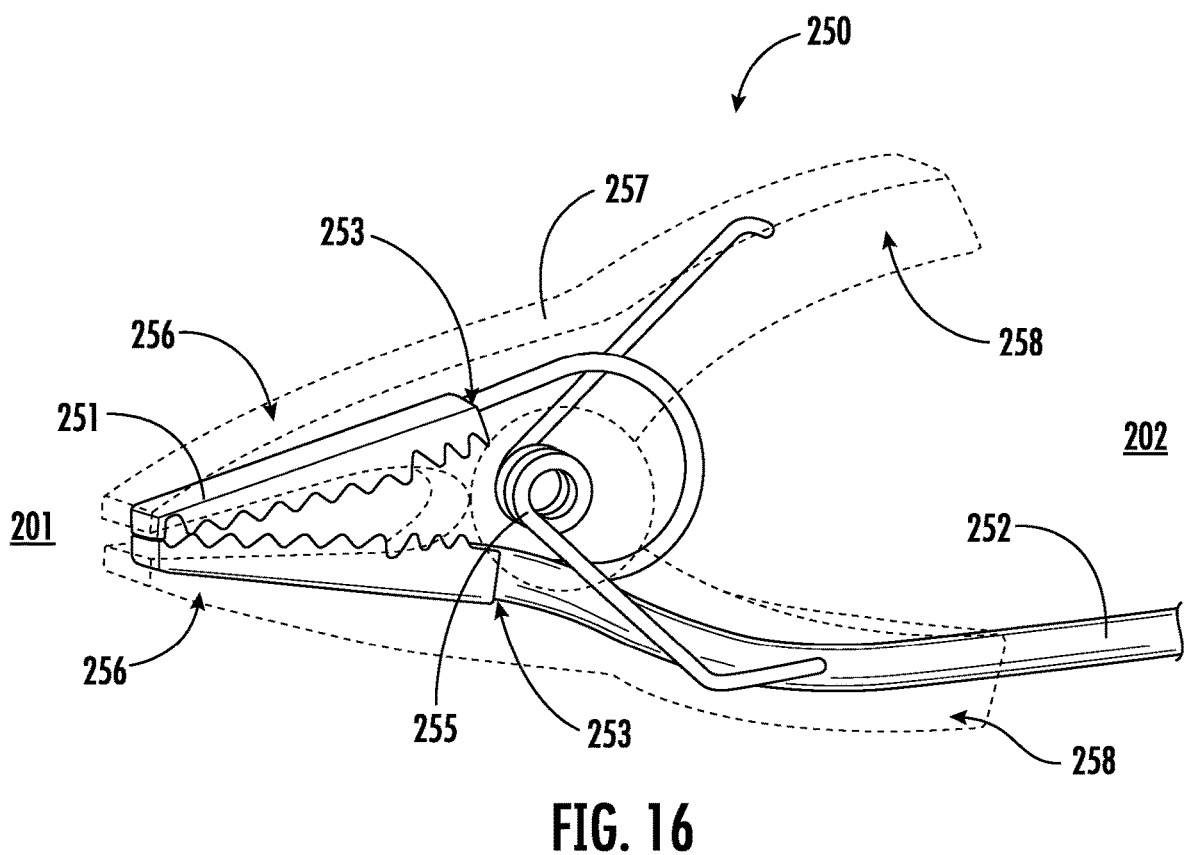
FIG. 16 is a see-through perspective view of an exemplary embodiment of an energy transfer attachment in accordance with aspects of the present disclosure.
Figure 17:
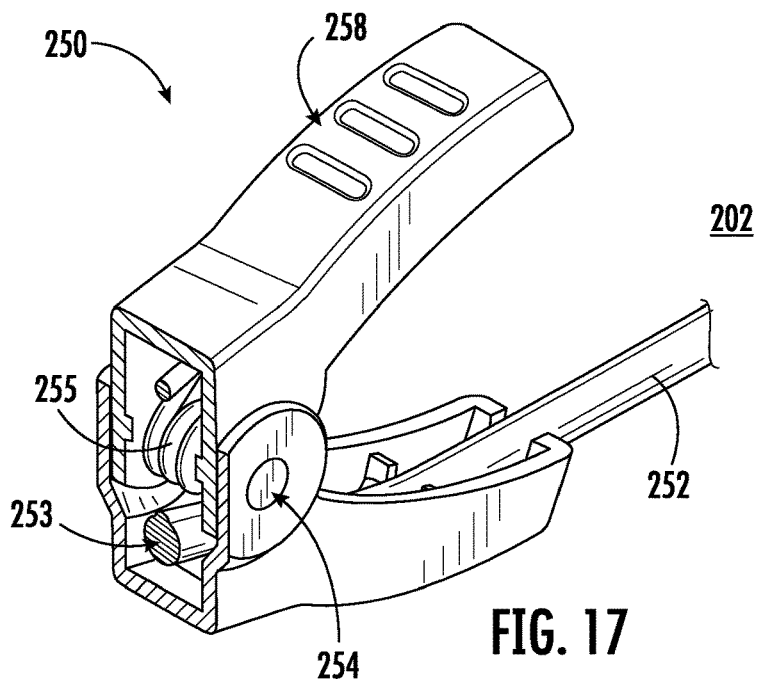
FIG. 17 is a cross-sectional perspective view of the energy transfer attachment of FIG. 15 in accordance with aspects of the present disclosure.

Referring now to FIGS. 15-17, perspective views of an embodiment of an energy transfer attachment 250 is provided. FIG. 17 provides a cross-sectional view of a portion of the energy transfer attachment 250 depicted in FIG. 15. Embodiments of the energy transfer attachment 250 depicted and described in regard to FIGS. 15-17 may form embodiments of the energy transfer attachments 52, 54 depicted and described in regard to FIG. 1. An electrical conduit 252 is operably coupled to the energy transfer attachment 250. The electrical conduit 252 may include any appropriate conductive material for transferring electrical energy. Electrical conduit 252 further includes any appropriate protective or insulative material substantially surrounding the conductive material. Embodiments of electrical conduit 252 depicted and described in regard to FIGS. 15-17 may form embodiments of the electrical conduit 56, 58 depicted and described in regard to FIG. 1. Accordingly, embodiments of energy transfer attachment 250 depicted in FIGS. 15-17 may form a positive or negative terminal attachment. Furthermore, embodiments of electrical conduit 252 depicted in FIGS. 15-17 may form respective positive or negative electrical conduits operably coupled to respective positive and negative terminal attachments formed as energy transfer attachment 250.

Referring to FIGS. 15-16, the energy transfer attachment 250 includes a clamp body 257 having a lever end or handle 258 and a connection end 256. FIG. 16 provides an exemplary see-through view of an embodiment of the energy transfer attachment 250 in which components at least partially internal to the clamp body 257 are depicted in further exemplary detail. A pair of clamp bodies 257 is connected in hinged arrangement to one another via a hinge 254. In some embodiments, hinge 254 is positioned between the handle 258 and the connection end 256. In still some embodiments, terminal interface 251 is positioned within the connection end 256. For instance, terminal interface 251 includes any appropriate conductive material (e.g., copper) operably coupled to receive electrical energy from electrical conduit 252. Terminal interface 251 may form a plurality of teeth or edges. For instance, terminal interface 251 may form clamp or clip surfaces at which a conductive material attaches to a conductive material, such as at a battery, capacitor, or other appropriate structure for receiving energy from the energy transfer attachment 250. Clamp body 257, including connection end 256 and handle 258, includes any appropriate protective or insulative material suitable for a user to touch the clamp body 257.

Referring still to FIGS. 15-16, a reference first end 201 is defined proximate to the connection end 256 and distal to the handle 258. A reference second end 202 is defined proximate to the lever end 258 and electrical conduit 252 and distal to the connection end 256. Hinge 254 forms a pivot point separating the connection end 256 and the handle 258. In some embodiments, terminal interface 251 is positioned substantially or completely within the connection end 256. Stated differently, terminal interface 251 is formed and positioned substantially between hinge 254 and first end 201. Handle 258, or generally a portion of energy transfer attachment 250 from hinge 254 to second end 202, may be substantially absent of the terminal interface 251.

Additionally, as shown in FIG. 15, each of the handles 258 is shaped such that an outer surface thereof is curved and convex. The curved and convex shape of the handles 258 allows a user to stably grip the energy transfer attachment 250 while preventing the user's hand from sliding forward towards the connection end 256 of the energy transfer attachment 250. Furthermore, each of the handles 258 may include recesses that form a better gripping surface for the user's hand. According to one or more embodiments, each of the handles 258 may include three oval-shaped recesses, although a person of ordinary skill in the art would understand that there may be a different number of recesses and each recess may be shaped differently from that shown in FIG. 15. Alternatively, instead of the recesses, projections may be formed on each of the handles 258 to form a better gripping surface.

Referring now to the cross sectional view provided in FIG. 17, a terminal end 253 of electrical conduit 252 is positioned at or proximate to the first end 201. In some embodiments, hinge 254 includes a spring or hinge structure 255 configured to generate a clamping force to push connection ends 256 (FIG. 15) together and allow connection ends 256 to separate when handles 258 are forced toward one another. Electrical conduit 252 may extend along an axis from second end 202 toward first end 201 co-planar or co-axial to hinge structure 255. Electrical conduit 252 may furthermore extend along the axis from second end 202 toward first end 201 to the connection end 256 (FIG. 15). Accordingly, terminal end 253 may extend to the connection end 256 and operably couple to terminal interface 251 (FIG. 15) at the connection end 256.

Figure 18:
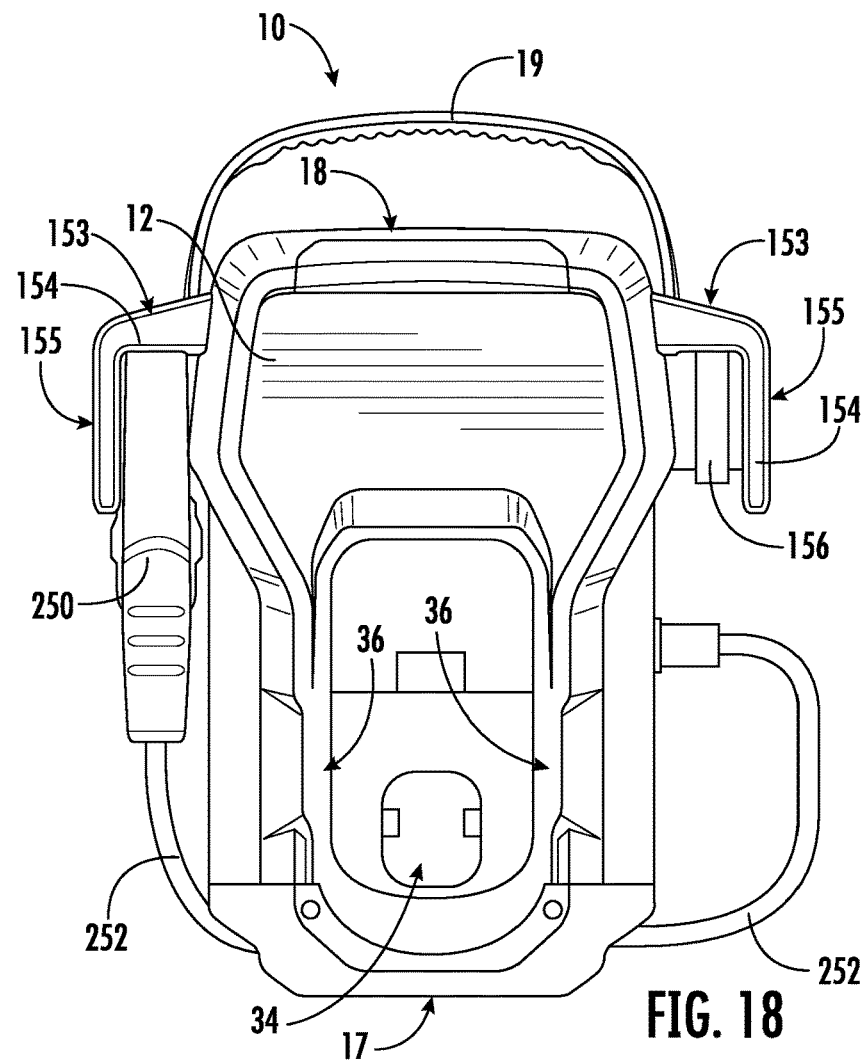
FIG. 18 is a top-down view of an exemplary embodiment of a fluid and power provision apparatus in accordance with aspects of the present disclosure.

FIG. 18 provides a top-down view of an exemplary embodiment of apparatus 10. FIG. 18 may omit various components or structures for the sake of clarity, such as an energy transfer attachment and electrical conduit that may extend to and position at wing 154. Referring back to FIG. 1, and further depicted in FIG. 18, in some embodiments, outer body 11 forms a wing 152, 154 extending from sides of the apparatus 10. Wing 152, 154 is configured to provide a latch interface or connection interface 156 at which energy transfer attachments 52, 54 may couple and secure onto outer body 11. Embodiments of outer body 11 may include a first wing 152 extending from the first side 15 and a second wing 154 extending from the second side 16. Each wing 152, 154 may include a first portion 153 extending outward from respective sides 15, 16. Wing 152, 154 may include a second portion 155 extending substantially co-directional or parallel to sides 15, 16. In some embodiments, interface 156 extends substantially co-directional or parallel to sides 15, 16 and corresponding to an extension of terminal interface 251 at the energy transfer attachment 250. In some embodiments, the interface 156 extends between second portion 155 and the respective side 15, 16 from which the wing 152, 154 is extended. Interface 156 may form a platform providing a surface at which connection ends 256 of respective energy transfer attachments 52, 54 may clamp and affix to outer body 11. In some embodiments, wings 152, 154 are formed integrally from one or both of outer cover 12 and base 14. Wings 152, 154 may each form recesses, grooves, or textured surfaces configured to retain energy transfer attachments 52, 54, such as connection ends 256, onto outer body 11. In some embodiments, interface 156 may be recessed relative to first portion 153, second portion 155, or both. For instance, interface 156 may form a platform at which grooves or recesses are formed. Grooves or recesses at the interface 156 may extend co-directional to an extension of the energy transfer attachment 250 (e.g., co-directional to an extension between first end 201 and second end 202 at the energy transfer attachment 250.

Embodiments of the apparatus 10 depicted and described herein provide an energy transfer device, such as a portable battery booster or jump starter, combined with an air supply device, such as an inflator, within a single, compact package. Embodiments provided herein may be configured to utilize energy from capacitor 60, an external battery or energy cell connected at power supply port 34, or both, to provide energy to, e.g., a vehicle battery, via energy transfer attachments 52, 54. Capacitor 60, external battery or energy cell connected at power supply port 34, or both, may further provide energy to operate the air supply device or pump assembly 100 including motor 150, transmission system 200, and piston assembly 300. In some embodiments, collar assembly 320 provides a flowpath for receiving and pumping air through air supply conduit 40, and furthermore a mount structure for retaining and receiving piston sleeve 310. Embodiments of collar assembly 320 furthermore provide a mount structure for housing 308 and various components of transmission system 200. Embodiments of collar assembly 320, piston sleeve 310, and housing 308 allow for combining an air supply device and battery booster within interior 22 of apparatus 10 into a compact, portable unit. Embodiments of energy transfer attachment 250 provided herein may prevent shock or other undesired energy transfer to user or through pathways other than terminal interface 251.

While various embodiments depicted and described herein include components, structures, assemblies, devices, or apparatuses configured to receive, pump, and flow air, it should be appreciated that gaseous fluids generally may be received, pumped, and flowed. Accordingly, air supply devices and components thereof may generally include fluid supply devices.

Further aspects and embodiments of the present subject matter are provided in the following clauses:

1. A fluid and power provision apparatus, the apparatus including a power provision device; a pump assembly, the pump assembly including a motor, a transmission system, a piston assembly, and a collar assembly, wherein the piston assembly includes a piston sleeve, a piston, and a piston arm operably coupled to the piston and the transmission system to transmit energy from the motor to articulate the piston within the piston sleeve, wherein the collar assembly forms a collar plenum, a first flowpath, and a second flowpath, the piston sleeve extending at least in part into the collar plenum, the first flowpath extending in fluid communication from the collar plenum to a fluid supply outlet, the second flowpath extending in fluid communication from an interior of the apparatus to the first flowpath.
2. The apparatus of any one or more clauses herein, wherein the collar assembly includes a first manifold forming the first flowpath, and wherein the collar assembly includes a second manifold forming the second flowpath.
3. The apparatus of any one or more clauses herein, wherein the collar assembly includes a cylindrical portion forming the collar plenum, and wherein the first manifold extends from the cylindrical portion.
4. The apparatus of any one or more clauses herein, wherein the second manifold extends from the first manifold.
5. The apparatus of any one or more clauses herein, wherein the first manifold, the second manifold, and the cylindrical portion form a unitary, monolithic component.
6. The apparatus of any one or more clauses herein, the piston assembly including a housing, the housing configured to support at least a portion of the transmission system.
7. The apparatus of any one or more clauses herein, wherein the housing and the piston sleeve form a unitary, monolithic component.
8. The apparatus of any one or more clauses herein, the transmission system including a gear operably coupled to an output gear at the motor; a first shaft coupled to a housing, wherein housing allows the first shaft to rotate along a central axis, and wherein the gear is operably coupled to the first shaft to allow rotation of the gear along the central axis.
9. The apparatus of any one or more clauses herein, wherein the piston arm is operably coupled to the gear through a second shaft coupled to the gear, wherein the second shaft is off-center from the central axis.
10. The apparatus of any one or more clauses herein, the power provision device including a capacitor configured to transfer energy through a pair of electrical conduits and respective energy transfer attachments.
11. The apparatus of any one or more clauses herein, the apparatus including a power supply interface, the power supply interface including a power supply port configured to receive an energy cell, battery, capacitor, or energy input plug.
12. The apparatus of any one or more clauses herein, wherein the collar assembly and the piston sleeve each form respective keys, wherein one or both of the collar assembly and the piston sleeve are configured to rotate to align the respective keys adjacent to one another.
13. The apparatus of any one or more clauses herein, wherein the piston sleeve includes a piston cylinder extending into the collar plenum, and wherein the key at the piston sleeve is positioned at the piston cylinder within the collar plenum.
14. The apparatus of any one or more clauses herein, the apparatus including a spring extending from an end wall of the collar assembly to a wall at the piston sleeve.
15. The apparatus of any one or more clauses herein, wherein the piston sleeve includes a piston cylinder extending from the wall at the piston sleeve into the collar plenum, and wherein the spring extends through a piston plenum formed within the piston cylinder.
16. A battery booster and air supply apparatus, the apparatus including a base at least partially forming an interior of the apparatus; a power provision device including a capacitor positioned at the interior of the apparatus, the capacitor configured to transfer energy through a pair of electrical conduits and respective energy transfer attachments; a fluid supply apparatus including a pump assembly positioned at the interior of the apparatus, the pump assembly including a motor, a transmission system, a piston assembly, and a collar assembly; an air supply conduit extending in fluid communication from the piston assembly, wherein an attachment end is affixed to the air supply conduit distal to the pump assembly, wherein the piston assembly includes a piston sleeve, a piston, and a piston arm operably coupled to the piston and the transmission system to transmit energy from the motor to articulate the piston within the piston sleeve, wherein the collar assembly forms a collar plenum, a first flowpath, and a second flowpath, the piston sleeve extending at least in part into the collar plenum, the first flowpath extending in fluid communication from the collar plenum to the air supply conduit, the second flowpath extending in fluid communication from an interior of the apparatus to the first flowpath.
17. The apparatus of any one or more clauses herein, wherein the collar assembly includes a first manifold forming the first flowpath, wherein the collar assembly includes a second manifold forming the second flowpath, and wherein the collar assembly includes a cylindrical portion forming the collar plenum, and wherein the first manifold extends from the cylindrical portion, and wherein the first manifold, the second manifold, and the cylindrical portion form a unitary, monolithic component.
18. The apparatus of any one or more clauses herein, the piston assembly including a housing formed with the piston sleeve as a unitary, monolithic component, the housing configured to support at least a portion of the transmission system.
19. The apparatus of any one or more clauses herein, the transmission system including a gear operably coupled to an output gear at the motor; a first shaft coupled to a housing, wherein housing allows the first shaft to rotate along a central axis, wherein the gear is operably coupled to the first shaft to allow rotation of the gear along the central axis, and wherein the piston arm is operably coupled to the gear through a second shaft coupled to the gear, wherein the second shaft is off-center from the central axis.

20. The apparatus of any one or more clauses herein, wherein the piston sleeve includes a piston cylinder extending from a wall at the piston sleeve into the collar plenum, and wherein a spring extends through a piston plenum formed within the piston cylinder, and wherein the apparatus includes the spring extending within the piston plenum from an end wall of the collar assembly to the wall at the piston sleeve.

21. A battery booster apparatus, the apparatus including an outer body forming an interior, wherein a wing forming a recessed platform extends from the outer body; and an energy transfer attachment operably coupled to an electrical conduit, the electrical conduit operably coupled to a power provision device positioned at the interior, the energy transfer attachment including a pair of clamp bodies connected in hinged arrangement at a hinge, the clamp body including a handle and a connection end, wherein the hinge is positioned between the handle and the connection end, and wherein a terminal interface including a conductive material is positioned at the connection end.

22. The battery booster apparatus of any one or more clauses herein, including the battery booster and air supply apparatus of any one or more clauses herein.

23. The battery booster apparatus of any one or more clauses herein, including the fluid and power provision apparatus of any one or more clauses herein.

24. The fluid and power provision apparatus of any one or more clauses herein, including the battery booster apparatus of any one or more clauses herein.

25. The battery booster and air supply apparatus of any one or more clauses herein, including the fluid and power provision apparatus of any one or more clauses herein.

26. An apparatus including the battery booster apparatus, the battery booster and air supply apparatus, or the fluid and power provision apparatus of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fluid and power provision apparatus, the apparatus comprising:
   an outer body forming an interior;
   a power provision device positioned in the interior of the outer body;
   a pump assembly positioned in the interior of the outer body, the pump assembly comprising a motor, a transmission system, a piston assembly, and a collar assembly,
   wherein the piston assembly comprises a piston sleeve, a piston, and a piston arm operably coupled to the piston and the transmission system to transmit energy from the motor to articulate the piston within the piston sleeve,
   wherein the collar assembly forms a collar plenum, a first flowpath, and a second flowpath, the piston sleeve extending at least in part into the collar plenum, the first flowpath extending in fluid communication from the collar plenum to a fluid supply outlet, the second flowpath extending in fluid communication from the interior of the outer body to the first flowpath,
   wherein the collar assembly and the piston sleeve each form respective keys, wherein one or both of the collar assembly and the piston sleeve are configured to rotate to align the respective keys adjacent to one another.

2. The apparatus of claim 1, wherein the collar assembly comprises a first manifold forming the first flowpath, and wherein the collar assembly comprises a second manifold forming the second flowpath.

3. The apparatus of claim 2, wherein the collar assembly comprises a cylindrical portion forming the collar plenum, and wherein the first manifold extends from the cylindrical portion.

4. The apparatus of claim 3, wherein the second manifold extends from the first manifold.

5. The apparatus of claim 3, wherein the first manifold, the second manifold, and the cylindrical portion form a unitary, monolithic component.

6. The apparatus of claim 1, the piston assembly comprising a housing, the housing configured to support at least a portion of the transmission system.

7. The apparatus of claim 6, wherein the housing and the piston sleeve form a unitary, monolithic component.

8. The apparatus of claim 1, the transmission system comprising:
   a gear operably coupled to an output gear at the motor;
   a first shaft coupled to a housing, wherein housing allows the first shaft to rotate along a central axis, and wherein the gear is operably coupled to the first shaft to allow rotation of the gear along the central axis.

9. The apparatus of claim 8, wherein the piston arm is operably coupled to the gear through a second shaft coupled to the gear, wherein the second shaft is off-center from the central axis.

10. The apparatus of claim 1, the power provision device comprising:
    a capacitor configured to transfer energy through a pair of electrical conduits and respective energy transfer attachments.

11. The apparatus of claim 1, the apparatus comprising a power supply interface, the power supply interface comprising a power supply port configured to receive an energy cell, battery, capacitor, or energy input plug.

12. The apparatus of claim 1, wherein the piston sleeve comprises a piston cylinder extending into the collar plenum, and wherein the key at the piston sleeve is positioned at the piston cylinder within the collar plenum.

13. The apparatus of claim 1, the apparatus comprising:
    a spring extending from an end wall of the collar assembly to a wall at the piston sleeve.

14. The apparatus of claim 13, wherein the piston sleeve comprises a piston cylinder extending from the wall at the piston sleeve into the collar plenum, and wherein the spring extends through a piston plenum formed within the piston cylinder.

15. The fluid and power provision apparatus of claim 1, the apparatus comprising:
- an energy transfer attachment operably coupled to an electrical conduit, the electrical conduit operably coupled to the power provision device, the energy transfer attachment comprising a pair of clamp bodies connected in hinged arrangement at a hinge, the pair of clamp bodies comprising a handle and a connection end.

16. The fluid and power provision apparatus of claim 15, wherein the hinge is positioned between the handle and the connection end, and wherein a terminal interface comprising a conductive material is positioned at the connection end.

17. The fluid and power provision apparatus of claim 1, the apparatus comprising:
- an air supply conduit extending in fluid communication from the piston assembly, wherein an attachment end is affixed to the air supply conduit distal to the pump assembly.

18. The fluid and power provision apparatus of claim 17, wherein the collar assembly comprises a first manifold forming at least a portion of the first flowpath, and wherein the collar assembly comprises a second manifold forming the second flowpath.

19. The fluid and power provision apparatus of claim 18, wherein the air supply conduit is connectable to the first manifold at an interface of the first flowpath.

\* \* \* \* \*